US012612510B2

(12) United States Patent
Kim et al.

(10) Patent No.: US 12,612,510 B2
(45) Date of Patent: Apr. 28, 2026

(54) TRIESTER-BASED PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Jeong Ju Moon, Daejeon (KR); Eun Suk Kim, Daejeon (KR); Joo Ho Kim, Daejeon (KR); Seung Taek Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 208 days.

(21) Appl. No.: 18/030,484

(22) PCT Filed: Jun. 22, 2022

(86) PCT No.: PCT/KR2022/008886

§ 371 (c)(1),
(2) Date: Apr. 5, 2023

(87) PCT Pub. No.: WO2022/270911

PCT Pub. Date: Dec. 29, 2022

(65) Prior Publication Data

US 2023/0374262 A1 Nov. 23, 2023

(30) Foreign Application Priority Data

Jun. 22, 2021 (KR) ........................ 10-2021-0080756

(51) Int. Cl.

*C08K 5/11* (2006.01)
*C08K 5/12* (2006.01)
*C08L 27/06* (2006.01)

(52) U.S. Cl.

CPC .................. *C08K 5/11* (2013.01); *C08K 5/12* (2013.01); *C08L 27/06* (2013.01)

(58) Field of Classification Search

CPC ........................................................ C08K 5/11

See application file for complete search history.

(56) References Cited

U.S. PATENT DOCUMENTS

| | | | | |
|---|---|---|---|---|
| 6,740,254 | B2 * | 5/2004 | Zhou | C08K 5/103 252/182.13 |
| 2003/0116750 | A1 | 6/2003 | Zhou et al. | |
| 2003/0120104 | A1 | 6/2003 | Zhou et al. | |
| 2004/0106819 | A1 | 6/2004 | Zhou et al. | |
| 2010/0056681 | A1 | 3/2010 | Colle et al. | |
| 2010/0249299 | A1 | 9/2010 | Dakka et al. | |
| 2011/0021680 | A1 | 1/2011 | Colle et al. | |
| 2011/0098390 | A1 * | 4/2011 | Dakka | C11C 3/02 252/182.28 |
| 2011/0166271 | A1 | 7/2011 | Hong et al. | |
| 2012/0022197 | A2 | 1/2012 | Dakka et al. | |
| 2013/0072611 | A1 | 3/2013 | Kwon et al. | |
| 2014/0228494 | A1 | 8/2014 | Colle et al. | |
| 2016/0297950 | A1 | 10/2016 | Jing et al. | |
| 2022/0185989 | A1 | 6/2022 | DeLoach et al. | |
| 2023/0374263 | A1 | 11/2023 | Kim et al. | |

FOREIGN PATENT DOCUMENTS

| | | | |
|---|---|---|---|
| CN | 1604950 | A | 4/2005 |
| CN | 102947377 | A | 2/2013 |
| JP | 11-349766 | A | 12/1999 |
| JP | 2003055311 | A | 2/2003 |
| JP | 2003-221462 | A | 8/2003 |
| JP | 2005513239 | A | 5/2005 |
| JP | 2012502160 | A | 1/2012 |
| KR | 10-2004-0071179 | A | 8/2004 |
| KR | 10-2009-0009437 | A | 1/2009 |
| KR | 10-2010-0031391 | A | 3/2010 |
| KR | 10-2011-0122571 | A | 11/2011 |
| WO | 2003054106 | A1 | 7/2003 |
| WO | 2010/027640 | A1 | 3/2010 |
| WO | 2011139016 | A2 | 11/2011 |
| WO | 2020263595 | A1 | 12/2020 |
| WO | 2022270910 | A1 | 12/2022 |

* cited by examiner

*Primary Examiner* — Michael F Pepitone
(74) *Attorney, Agent, or Firm* — BRYAN CAVE LEIGHTON PAISNER LLP

(57) ABSTRACT

The present invention relates to a triester-based plasticizer composition including a product derived from the esterification of a carboxylic acid composition having a hexanoic acid isomer mixture and benzoic acid, and a trihydric alcohol. If the plasticizer composition is applied to a resin, migration resistance and volatile loss may be maintained at equal levels, and mechanical properties, absorption rate, stress migration and plasticization efficiency may be markedly improved in contrast to a conventional plasticizer.

10 Claims, No Drawings

TRIESTER-BASED PLASTICIZER COMPOSITION AND RESIN COMPOSITION COMPRISING THE SAME

The present application is a national phase entry pursuant to 35 U.S.C. § 371 of International Application No. PCT/KR2022/008886 filed on Jun. 22, 2022, and claims priority to and the benefit of Korean Patent Application No. 10-2021-0080756, filed on Jun. 22, 2021, the entire contents of which are incorporated herein by reference.

FIELD

The present invention relates to a plasticizer composition including one or more triester groups, and a resin composition comprising the same.

BACKGROUND

Generally, plasticizers are obtained through the reaction of alcohols with polycarboxylic acids such as phthalic acid and adipic acid for forming corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, or extrusion/injection compound type of industry, the demand for eco-friendly products is increasing. In order to reinforce the quality properties, processability and productivity by the finished products, a suitable plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which may be used in PVC, hardness or sol viscosity is high, absorption rate of a plasticizer is relatively slow, and migration and stress migration are not good.

As improvements on the above limitations, the application of a transesterification product with butanol as a plasticizer, as a composition including DEHTP may be considered. However, plasticization efficiency is improved but volatile loss or thermal stability is inferior and mechanical properties are somewhat degraded, and the improvement of physical properties is required. Accordingly, generally, there is no solution other than mixing with a different second plasticizer at the present time.

However, in case of applying the second plasticizer, there are drawbacks of generating unexpected defects as follows: the change of the physical properties is hard to predict; the application may become a factor of increasing the unit cost of the product; the improvement of the physical properties is not clearly shown except for specific cases; and problems relating to compatibility with a resin may arise.

In addition, if a material like tri(2-ethylhexyl) trimellitate or triisononyl trimellitate is applied as a trimellitate-based product in order to improve the inferior migration and loss properties of the DEHTP products, migration or loss properties may be improved, but plasticization efficiency may be degraded, and a great deal of the material is required to provide a resin with suitable plasticization effects, and considering the relatively high unit price of the products, commercialization thereof is impossible.

Accordingly, the development of products for solving the environmental issues of the conventional phthalate-based products or products for improving inferior physical properties of the eco-friendly products is required.

SUMMARY

The present invention is to provide a plasticizer composition which may maintain equal levels of migration resistance and volatile loss as a conventional plasticizer, while markedly improving mechanical properties, absorption rate, stress migration and plasticization efficiency, by including triesters which are products derived from the esterification of a carboxylic acid composition comprising a hexanoic acid isomer mixture, benzoic acid, and a trihydric alcohol.

The present invention provides a plasticizer composition and a resin composition.

The present invention provides a triester-based plasticizer composition, comprising one or more triesters of the following Formula 1, wherein $R_1$ to $R_3$ of Formula 1 are derived from a carboxylic acid composition comprising a hexanoic acid isomer mixture and benzoic acid:

[Formula 1]

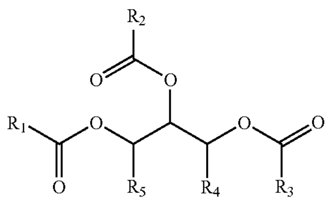

in Formula 1, $R_1$ to $R_3$ are each independently an n-pentyl group, a branch-type pentyl group, a cyclopentyl group, or a phenyl group, and $R_4$ and $R_5$ are each independently hydrogen or an alkyl group of 1 to 4 carbon atoms.

The present invention provides the plasticizer composition as described above, wherein the carboxylic acid composition comprises the hexanoic acid isomer mixture and the benzoic acid in a weight ratio of 99:1 to 50:50.

The present invention provides the plasticizer composition as described above, wherein the hexanoic acid isomer mixture has a degree of branching of 2.0 or less.

The present invention provides the plasticizer composition as described above, wherein the hexanoic acid isomer mixture comprises 2-methylpentanoic acid and 3-methylpentanoic acid.

The present invention provides the plasticizer composition as described above, wherein the hexanoic acid isomer mixture comprises 1-hexanoic acid, 2-methylpentanoic acid, 3-methylpentanoic acid and cyclopentyl methanoic acid.

The present invention provides the plasticizer composition as described above, wherein the hexanoic acid isomer mixture comprises 20 to 95 parts by weight of a branch-type hexanoic acid with respect to total 100 parts by weight of the mixture.

The present invention provides the plasticizer composition as described above, wherein the hexanoic acid isomer mixture comprises 30 parts by weight or less of cyclopentyl methanoic acid with respect to total 100 parts by weight of the mixture.

The present invention provides the plasticizer composition as described above, wherein $R_4$ and $R_5$ are hydrogen.

The present invention also provides a resin composition comprising: 100 parts by weight of a resin; and 5 to 150 parts by weight of the plasticizer composition described above and herein.

The present invention provides the resin composition as described above, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, and synthetic rubber.

The plasticizer composition according to an embodiment of the present invention, if used in a resin composition, may maintain equal levels of migration resistance and volatile loss in comparison to the conventional plasticizer, and may markedly improve mechanical properties, absorption rate, stress migration and plasticization efficiency, relative thereto.

DETAILED DESCRIPTION

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

Definition of Terms

The term "composition" as used in the present disclosure includes a mixture of materials including the corresponding composition as well as a reaction product and a decomposition product formed from the materials of the corresponding composition.

The term "isomer" as used in the present disclosure does not intend to differentiate all meanings of isomers but intends to mean structural isomers, that is, the relation having the same carbon number but different bonding structures so as to differentiate these types, and does not mean materials differentiated as stereoisomers such as enantiomers and diastereomers.

The term "straight vinyl chloride polymer" as used in the present disclosure may be one type of vinyl chloride polymers and polymerized by suspension polymerization, bulk polymerization, etc., and may refer to a polymer having a porous particle shape in which a large number of pores having a size of tens to hundreds of micrometers are dispersed, no cohesiveness, and excellent flowability.

The term "paste vinyl chloride polymer" as used in the present disclosure may be one type of vinyl chloride polymers and polymerized by microsuspension polymerization, microseed polymerization, emulsion polymerization, etc., and may refer to a polymer having minute particles without pores and a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of" excludes unnecessary ones for operation and precludes optional other components, steps or processes from the scope of optional continuous description. The term "consisting of" precludes optional components, steps or processes, which are not particularly described or illustrated.

Measurement Methods

In the present disclosure, the content analysis of the components in a composition is conducted by gas chromatography measurement using gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the present disclosure, "hardness" means Shore hardness (Shore "A" and/or Shore "D") at 25° C. and is measured under conditions of 3T 10s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen at a cross head speed of 200 mm/min (1T) using a test apparatus of U.T.M (manufacturer: Instron, model name: 4466), measuring a point where the specimen is cut, and calculating according to the following Mathematical Formula 1:

Tensile strength (kgf/cm$^2$)=load value (kgf)/thickness (cm)×width (cm) [Mathematical Formula 1]

In the present disclosure, "elongation rate" is obtained according to an ASTM D638 method by drawing a specimen at a cross head speed of 200 mm/min (1T) using the U.T.M, measuring a point where the specimen is cut, and calculating according to the following Mathematical Formula 2.

Elongation rate (%)=length after elongation/initial length×100 [Mathematical Formula 2]

In the present disclosure, "migration loss" is obtained according to KSM-3156, by which a specimen with a thickness of 2 mm or more is obtained, glass plates are attached onto both sides of the specimen and a load of 1 kgf/cm$^2$ is applied. The specimen is placed in a hot air circulation type oven (80° C.) for 72 hours, then taken out and cooled at room temperature for 4 hours. Then, the glass plates attached onto both sides of the specimen are removed, the weights before and after standing the glass plates and the specimen plate in the oven are measured, and the migration loss is calculated according to Mathematical Formula 3.

Migration loss (%)={[(weight of initial specimen)−(weight of specimen after standing in oven)]/(weight of initial specimen)}×100 [Mathematical Formula 3]

In the present disclosure, "volatile loss" is obtained by processing a specimen at 80° C. for 72 hours and then, measuring the weight of the specimen according to Mathematical Formula 4.

Volatile loss (wt %)={[(weight of initial specimen)−(weight of specimen after processing)]/(weight of initial specimen)}×100 [Mathematical Formula 4]

In case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present invention will be explained in more detail to assist the understanding of the present invention.

According to an embodiment of the present invention, a plasticizer composition comprises one or more triesters of Formula 1 below, wherein the alkyl groups of the triester are derived from a carboxylic acid composition comprising a hexanoic acid isomer mixture and benzoic acid.

[Formula 1]

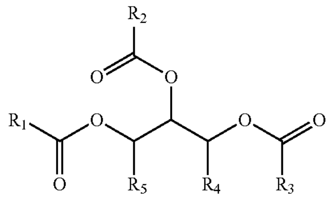

In Formula 1, $R_1$ to $R_3$ are each independently an n-pentyl group, a branch type pentyl group, a cyclopentyl group, or a phenyl group, and $R_4$ and $R_5$ are each independently hydrogen or an alkyl group of 1 to 4 carbon atoms.

The plasticizer composition may be a product produced by the esterification of a carboxylic acid composition including a hexanoic acid isomer mixture and benzoic acid, with a trihydric alcohol, and accordingly, may be derived from a carboxylic acid having a carbon chain with 6 carbon atoms including a carbonyl group as central carbon. As $R_1$ to $R_3$ of Formula 1, a linear, branch-type or alicyclic alkyl group with carbon atoms may be applied, and as a derivative from the benzoic acid, a phenyl group may be applied as $R_1$ to $R_3$.

The plasticizer composition according to an embodiment of the present invention includes one or more triesters represented by Formula 1, wherein the number of triesters finally produced may be determined according to the number of hexanoic acids included in the hexanoic acid isomer mixture applied for the esterification and the benzoic acid. For example, if two types of isomers are included in the hexanoic acid isomer mixture, three types of carboxylic acids are present in the carboxylic acid composition, and at least 15 types of triesters may be included in the plasticizer composition.

In the plasticizer composition according to an embodiment of the present invention, an alkyl carboxylic acid with 6 carbons, i.e., hexanoic acid and benzoic acid are applied simultaneously, and the bonding force with a resin may be even further improved, and volatile loss and migration resistance may be improved. In this case, in the carboxylic acid composition, the hexanoic acid isomer mixture and the benzoic acid may be included in a weight ratio of 99:1 to 50:50, where an upper limit may preferably be 95:5, more preferably, 90:10, 85:15 or 80:20, and a lower limit may preferably be 55:45, more preferably, 60:40, 65:35 or 70:30. If the above-described range is satisfied, plasticization efficiency and elongation rate may be maintained to the levels of the conventional plasticizer with high performance.

In addition, if the hexanoic acid isomer mixture is applied, plasticization efficiency and mechanical properties may be improved simultaneously in contrast to a case applying another number of carbons. If an alkyl carboxylic acid with or less carbons is applied, mechanical properties, volatile loss and absorption rate might be inferior, and if an alkyl carboxylic acid with 7 or more carbons is applied, plasticization efficiency may be inferior, absorption rate may be very slow, and processability might be markedly deteriorated.

In addition, considering a compound with three ester groups as the triester, the plasticizer composition has excellent compatibility with a resin and excellent miscibility with other additives, and has lots of ester groups to immobilize a molecule in a polymer chain, and accordingly, may have excellent plasticization efficiency and mechanical properties, while maintaining suitable levels of migration resistance and volatile loss.

The alkyl group of the triester included in the plasticizer composition according to an embodiment of the present invention may be derived from a hexanoic acid isomer mixture having a degree of branching of 2.0 or less, preferably, the degree of branching of 1.5 or less, 1.3 or less, 1.2 or less, or 1.0 or less. In addition, the degree of branching may be 0.1 or more, 0.2 or more, 0.3 or more.

Here, the degree of branching may mean how many branch carbon atoms the alkyl groups bonded to a material included in the composition have, and may be determined according to the weight ratio of the corresponding material. For example, if 60 wt % of 1-hexanoic acid, 30 wt % of 2-methylpentanoic acid, and 10 wt % of 2-ethyl butanoic acid are included in a hexanoic acid mixture, the branch carbon numbers of each carboxylic acid are 0, 1 and 2, respectively, and the degree of branching may be calculated by $[(60\times0)+(30\times1)+(10\times2)]/100$, and may be 0.5. Meanwhile, in the present invention, the branch carbon number of cyclopentyl methanoic acid is regarded 0.

Specifically, according to the features that what ratio of a branch-type alkyl group is present among total alkyl radicals, further, what ratio of a specific branch-type alkyl radicals are present among the branch-type alkyl groups, plasticization efficiency and the physical properties of migration resistance/volatile loss may be balanced even further, and processability may be optimized. In addition, according to the interaction among multiple triesters included in the composition, marked improvement of mechanical properties such as tensile strength and elongation rate, and stress resistance may be achieved.

Through this, a material completely free from environmental issues, and at the same time, a product markedly improving the tensile strength of the conventional phthalate-based products could be accomplished, migration resistance and stress resistance of the conventional terephthalate-based products may be markedly improved, and a product having balanced physical properties and markedly improved levels thereof in contrast to the conventional commercial products could be achieved. The results could be found to be obtainable by the combination of an alkyl carboxylic acid with 6 carbons and benzoic acid that is the basic unit of an aromatic carboxylic acid.

According to an embodiment of the present invention, for optimal and favorable accomplishment of the above-described effects, a carboxylic acid composition in which the weight ratio range of the hexanoic acid isomer mixture and the benzoic acid are controlled, and at the same time, the type and amount of the isomers included in the hexanoic acid isomer mixture may be controlled.

The hexanoic acid isomer mixture may include essentially 2-methylpentanoic acid and 3-methylpentanoic acid. By including essentially the two isomers among various isomers in the isomer mixture, the above-described effects could be achieved with even higher reproducibility.

In addition, the hexanoic acid isomer mixture may further include 1-hexanoic acid and cyclopentyl methanoic acid in addition to the 2-methylpentanoic acid and 3-methylpentanoic acid. In the case of 1-hexanoic acid, specific physical properties tend to improve with its inclusion, but the amount must be controlled considering absorption rate or the processability of plasticization efficiency, and the same may apply for cyclopentyl methanoic acid.

In the plasticizer composition according to an embodiment of the present invention, in the hexanoic acid isomer mixture, branch-type hexanoic acid may be included in parts by weight or more, 30 parts by weight or more, 40 parts by weight or more, 50 parts by weight or more, and 95 parts by weight or less, 90 parts by weight or less, 85 parts by weight or less, 80 parts by weight or less, or 70 parts by weight or less, with respect to a total 100 parts by weight of the mixture.

In addition, 1-hexanoic acid may be included in 80 parts by weight or less, 70 parts by weight or less, 60 parts by weight or less, 50 parts by weight or less, 40 parts by weight or less, or 30 parts by weight or less, and 1 part by weight or more, 2 parts by weight or more, 5 parts by weight or more or 10 parts by weight or more, with respect to a total 100 parts by weight of the hexanoic acid isomer mixture.

The amounts of the branch-type and linear-type may be suitably controlled according to the application use of the triester-based plasticizer, and through the control of the ratios, desired physical properties could be achieved.

Further, the isomer mixture may further include cyclopentyl methanoic acid, and in this case, may be included in 30 parts by weight or less, with respect to a total 100 parts by weight of the isomer mixture. Preferably, 20 parts by weight or less, or 15 parts by weight or less, may be included. In the case of the cyclopentyl methanoic acid, the improvement of processability and the improvement of mechanical properties could be achieved only if included, and the amount thereof may be controlled considering the deterioration of physical properties according to the reduction of the relative contents of other isomers.

In the hexanoic acid isomer mixture determining the degree of branching of the plasticizer composition according to an embodiment of the present invention, various isomers may be included, typically four types of isomers as referred to, without excluding the presence of other isomers. For example, 4-methylpentanoic acid, 2-ethylbutanoic acid, 2,3-dimethylbutanoic acid, or the like may be included, and besides, the structural isomers of C6 alkyl carboxylic acid may be present.

In addition, the plasticizer composition according to an embodiment of the present invention is derived from the reaction of the above-described carboxylic acid composition including the hexanoic acid isomer mixture and benzoic acid, with a trihydric alcohol. The trihydric alcohol may be a glycerol-based compound and may be represented by, for example, Formula 2 below.

[Formula 2]

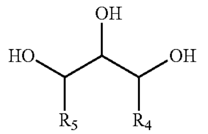

In Formula 2, $R_4$ and $R_5$ are the same as defined in Formula 1.

$R_4$ and $R_5$ may be each independently hydrogen or an alkyl group of 1 to 4 carbon atoms, preferably, hydrogen, a methyl group or an ethyl group, more preferably, hydrogen or a methyl group, and most preferably, glycerol where both $R_4$ and $R_5$ are hydrogen. The glycerol may contribute to improving the price competitiveness of the plasticizer considering that it is easy to supply, can be synthesized from a natural material, and it is a material easily obtained from other synthesis methods.

A method of preparing the plasticizer composition according to an embodiment of the present invention is a method well-known in the art, and any methods that may prepare the aforementioned plasticizer composition may be applied, without specific limitation.

That is, by suitably controlling the esterification reaction, the plasticizer composition according to the present invention may be prepared. For example, the composition may be prepared by the direct esterification of a carboxylic acid composition including a hexanoic acid isomer mixture and benzoic acid, with the glycerol-based compound represented by Formula 2, for example, glycerol.

The plasticizer composition according to an embodiment of the present invention is a material prepared by suitably performing the esterification reaction, and any preparation methods satisfying the aforementioned conditions. Specifically, controlling the weight ratio of the hexanoic acid isomer mixture and benzoic acid in the carboxylic acid composition and controlling the ratio of the branch-type hexanoic acid in the isomer mixture, may be applied, without specific limitation.

For example, the direct esterification may be performed by: a step of injecting a carboxylic acid composition and a glycerol-based compound represented by Formula 2, adding a catalyst and reacting under a nitrogen atmosphere; a step of removing unreacted alcohol and neutralizing unreacted acid; and a step of dehydrating by distillation under a reduced pressure and filtering.

The case of the carboxylic acid composition, may perform the main function determining the component ratio in the plasticizer composition prepared, and the theoretical molar ratio of 3:1 with the glycerol-based compound may be applied. If the carboxylic acid composition greater than the molar ratio is additionally injected, the reaction rate may be improved. In this case, the additional injection amount of the carboxylic acid composition may be 400 mol % or less, or 300 mol % or less, preferably, 200 mol % or less or 100 mol % or less, with respect to the equivalent of the carboxylic acid composition.

The catalyst may be, for example, at least one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as a heteropoly acid, natural/synthetic zeolites, cation and anion exchange resins, and an organometal such as tetraalkyl titanate and polymers thereof. In a particular embodiment, the catalyst may be tetraalkyl titanate. Preferably, as an acid catalyst having a low activation temperature, paratoluenesulfonic acid and methanesulfonic acid may be suitable.

The amount used of the catalyst may be different according to the type used, and for example, a homogeneous catalyst may be used in a range of 0.01 to 5.00 wt %, 0.01 to 3.00 wt %, 0.1 to 3.0 wt % or 0.1 to 2.0 wt %, based on a total 100 wt % of reactants; and a heterogeneous catalyst may be used in a range of 5 to 200 wt %, 5 to 100 wt %, 20 to 200 wt %, or 20 to 150 wt %, based on the total amount of the reactants.

In this case, the reaction temperature may be within a range of 100 to 280° C., 100 to 250° C., or 100 to 230° C.

According to another embodiment of the present invention, a resin composition including the plasticizer composition and a resin is provided.

The resin may be resins well-known in the art. For example, the resin may be one, or a mixture, selected from the group consisting of: a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer, without limitation.

The plasticizer composition may be included in 5 to 150 parts by weight, preferably, 5 to 130 parts by weight, or to 120 parts by weight, based on 100 parts by weight of the resin.

Generally, the resin using the plasticizer composition may be prepared through melt processing or plastisol processing, and a resin by the melt processing and a resin from the plastisol processing may be produced differently according to each polymerization method.

For example, in case of using a vinyl chloride polymer in melt processing, solid phase resin particles having a large average particle diameter are prepared by suspension polymerization, or the like, and the vinyl chloride polymer is referred to as a straight vinyl chloride polymer. In case of using a vinyl chloride polymer in plastisol processing, a sol state resin as minute resin particles are prepared by emulsion polymerization, or the like, and this vinyl chloride polymer is referred to as a paste vinyl chloride resin.

In case of the straight vinyl chloride polymer, a plasticizer may be included in a range of 5 to 80 parts by weight, with respect to 100 parts by weight of the polymer. In case of the paste vinyl chloride polymer, the plasticizer may be included in a range of 40 to 120 parts by weight, with respect to 100 parts by weight of the polymer.

The resin composition may further include a filler. The filler may be 0 to 300 parts by weight, preferably, 50 to 200 parts by weight, more preferably, 100 to 200 parts by weight, based on 100 parts by weight of the resin.

The filler may use fillers well-known in the art and is not specifically limited. For example, the filler may be a mixture of one or more kinds selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer, as necessary. Each of the other additives such as the stabilizer may be, for example, 0 to 20 parts by weight, preferably, 1 to 15 parts by weight, based on 100 parts by weight of the resin.

The stabilizer may use, for example, a calcium-zinc-based (Ca—Zn-based) stabilizer such as a composite stearate of calcium-zinc or a barium-zinc-based (Ba—Zn-based) stabilizer, but is not specifically limited.

The resin composition may be applied to both a melt processing and a plastisol processing as described above, and a calendaring processing, an extrusion processing, or an injection processing may be applied to the melt processing, and a coating processing, or the like may be applied to the plastisol processing.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

To a reactor equipped with a stirrer, a condenser and a decanter, 1360 g of a carboxylic acid composition including a hexanoic acid isomer mixture including about 9 wt % of 1-hexanoic acid, about 35 wt % of 2-methylpentanoic acid, about 44 wt % of 3-methylpentanoic acid, about 7 wt % of 4-methylpentanoic acid and about 5 wt % of cyclopentyl methanoic acid, and benzoic acid in a weight ratio of 70:30, 276 g of glycerol and 5 g of methanesulfonic acid were added, and esterification reaction was performed at a reaction temperature of 100 to 140° C. under a nitrogen atmosphere. After finishing the reaction, an unreacted acid was removed, a catalyst and a product were neutralized with an alkaline aqueous solution, and washed. An unreacted raw material and moisture were separated to finally obtain a triester-based plasticizer composition.

Examples 2

A triester-based plasticizer composition was obtained by the same method as in Example 1 except for using a mixture including about 20 wt % of 1-hexanoic acid, about 30 wt % of 2-methylpentanoic acid, about 35 wt % of 3-methylpentanoic acid, about 5 wt % of 4-methylpentanoic acid and about 10 wt % of cyclopentyl methanoic acid, as the hexanoic acid isomer mixture.

Examples 3

A triester-based plasticizer composition was obtained by the same method as in Example 1 except for using a mixture including about 2 wt % of 1-hexanoic acid, about 40 wt % of 2-methylpentanoic acid, about 50 wt % of 3-methylpentanoic acid, about 2 wt % of 4-methylpetanoic acid and about 6 wt % of cyclopentyl methanoic acid, as the hexanoic acid isomer mixture.

Examples 4

A triester-based plasticizer composition was obtained by the same method as in Example 1 except for using a mixture including about 5 wt % of 1-hexanoic acid, about 50 wt % of 2-methylpentanoic acid, about 30 wt % of 3-methylpentanoic acid, and about 15 wt % of cyclopentyl methanoic acid, as the hexanoic acid isomer mixture.

Examples 5

A triester-based plasticizer composition was obtained by the same method as in Example 1 except for using 1360 g of the carboxylic acid composition including the hexanoic acid isomer mixture and the benzoic acid in a weight ratio of 90:10.

Examples 6

A triester-based plasticizer composition was obtained by the same method as in Example 1 except for using 1360 g of the carboxylic acid composition including the hexanoic acid isomer mixture and the benzoic acid in a weight ratio of 80:20.

Examples 7

A triester-based plasticizer composition was obtained by the same method as in Example 1 except for using 1360 g of the carboxylic acid composition including the hexanoic acid isomer mixture and the benzoic acid in a weight ratio of 60:40.

Examples 8

A triester-based plasticizer composition was obtained by the same method as in Example 1 except for using 1360 g of the carboxylic acid composition including the hexanoic acid isomer mixture and the benzoic acid in a weight ratio of 50:50.

Comparative Example 1

Dioctyl phthalate (DOP, LG Chem,) was used as a plasticizer.

Comparative Example 2

Diisononyl phthalate (DINP), LG Chem,) was used as a plasticizer.

Comparative Example 3

GL300 which is a product of LG Chem, and is a dioctyl terephthalate, was used as a plasticizer.

Comparative Example 4

GL500 which is a product of LG Chem, and is a mixture of dioctyl terephthalate, butyloctyl terephthalate and dioctyl terephthalate, was used as a plasticizer.

Comparative Example 5

A triester-based plasticizer composition was obtained by the same method as in Example 1 except for applying an acid mixture obtained by mixing n-butanoic acid and benzoic acid in a weight ratio of 7:3 instead of the hexanoic acid isomer mixture.

Comparative Example 6

A triester-based plasticizer composition was obtained by the same method as in Example 1 except for using a carboxylic acid composition including only the hexanoic acid isomer mixture and excluding the benzoic acid.

Comparative Example 7

A triester-based plasticizer composition was obtained by the same method as in Example 1 except for using 2-ethylhexanoic acid instead of the hexanoic acid isomer mixture.

The type and amount used of the acid used in the Examples and Comparative Examples are summarized in Table 1 below.

TABLE 1

| | Type and amount (%) of alkyl carboxylic acid | | | | | Whtr. benzoic acid is used | Weight ratio of alkyl carboxylic acid:benzoic acid |
|---|---|---|---|---|---|---|---|
| | 1-Hexanoic acid | 2-Methylpentanoic acid | 3-Methylpentanoic acid | 4-Methylpentanoic acid | Cyclopentyl methanoic acid | | |
| Example 1 | 9 | 35 | 44 | 7 | 5 | ○ | 70:30 |
| Example 2 | 20 | 30 | 35 | 5 | 10 | ○ | 70:30 |
| Example 3 | 2 | 40 | 50 | 2 | 6 | ○ | 70:30 |
| Example 4 | 5 | 50 | 30 | 0 | 15 | ○ | 70:30 |
| Example 5 | 9 | 35 | 44 | 7 | 5 | ○ | 90:10 |
| Example 6 | 9 | 35 | 44 | 7 | 5 | ○ | 80:20 |
| Example 7 | 9 | 35 | 44 | 7 | 5 | ○ | 60:40 |
| Example 8 | 9 | 35 | 44 | 7 | 5 | ○ | 50:50 |
| Comparative Example 1 | | | — | | | X | — |
| Comparative Example 2 | | | — | | | X | — |
| Comparative Example 3 | | | — | | | X | — |
| Comparative Example 4 | | | — | | | X | — |
| Comparative Example 5 | | | n-butanoic acid alone | | | ○ | 70:30 |
| Comparative Example 6 | 9 | 35 | 44 | 7 | 5 | X | — |
| Comparative Example 7 | | | 2-ethylhexanoic acid alone | | | ○ | 70:30 |

Experimental Example 1: Evaluation of Sheet Performance

By using the plasticizers of the Examples and Comparative Examples, specimens were manufactured according to ASTM D638 and the formulation and manufacturing conditions below.

(1) Formulation: 100 parts by weight of a straight vinyl chloride polymer (LS100), 50 parts by weight of a plasticizer and 3 parts by weight of a stabilizer (BZ-153T)

(2) Mixing: mixing at 98° C. in 700 rpm (3) Manufacture of specimen: 1T, 2T and 3T sheets were manufactured by processing at 160° C. for 4 minutes by a roll mill, and at 180° C. for 2.5 minutes (low pressure) and 2 minutes (high pressure) by a press.

(4) Test items

1) Hardness: Shore hardness (Shore "A" and "D") at 25° C. was measured using a 3T specimen for 10 seconds using ASTM D2240. The plasticization efficiency was assessed excellent if the value was small.

2) Tensile strength: By an ASTM D638 method, a specimen was drawn at a cross-head speed of 200 mm/min using a test apparatus of U.T.M (manufacturer: Instron, model name: 4466), and a point where the 1T specimen was cut was measured. The tensile strength was calculated by Mathematical Formula 1.

Tensile strength ($kgf/cm^2$)=load value (kgf)/thickness (cm)×width (cm) [Mathematical Formula 1]

3) Elongation rate measurement: By an ASTM D638 method, a specimen was drawn at a cross-head speed of 200 mm/min using a test apparatus of U.T.M, and a point where the 1T specimen was cut was measured. The elongation rate was calculated by Mathematical Formula 2.

Elongation rate (%)=length after elongation/initial length×100 [Mathematical Formula 2]

4) Migration loss measurement: According to KSM-3156, a specimen with a thickness of 2 mm or more was obtained, glass plates were attached onto both sides of 1T specimen, and a load of 1 $kgf/cm^2$ was applied. The specimen was placed in a hot air circulation type oven (80° C.) for 72 hours and then taken out and cooled at room temperature for 4 hours. Then, the weights of the specimen from which glass plates attached onto both sides thereof were removed, were measured before and after standing the glass plates and the specimen plate in the oven, and the migration loss was calculated by Mathematical Formula 3.

Migration loss (%)=[{(weight of initial specimen)−(weight of specimen after standing in oven)}/(weight of initial specimen)]×100 [Mathematical Formula 3]

5) Volatile loss measurement: The specimen manufactured was processed at 80° C. for 72 hours, the weight of the specimen was measured, and measurement was performed by Mathematical Formula 4.

Volatile loss (wt %)=[{(weight of initial specimen)−(weight of specimen after processing)}/(weight of initial specimen)]×100 [Mathematical Formula 4]

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the value was closer to 0.

7) Absorption rate measurement

Absorption rate was evaluated by measuring the time consumed for mixing a resin and an ester compound and stabilizing the torque of a mixer by using a planetary mixer (Brabender, P600) in conditions of 73° C. and 60 rpm. For reference, if the absorption rate is measured as less than 4 minutes, it seems that the absorption and migration of a plasticizer are repeatedly carried out during processing, and if the absorption rate is greater than 9 minutes, it is considered that the absorption itself is hardly carried out. Accordingly, if a value between 4 minutes to 9 minutes is not measured, it is evaluated as impossible to process.

(5) Evaluation Results

The evaluation results on the test items are shown in Table 2 below.

TABLE 2

| | Hardness | | Tensile strength | Elong rate | Migr loss | Volat. loss | Stress | Abs. rate |
|---|---|---|---|---|---|---|---|---|
| | (Sh. A) | (Sh. D) | ($kgf/cm^2$) | (%) | (%) | (%) | resist. | (mm:ss) |
| Example 1 | 82.3 | 37.6 | 212.1 | 325.3 | 1.70 | 1.85 | 0.5 | 4:00 |
| Example 2 | 82.2 | 37.4 | 215.4 | 330.2 | 1.60 | 1.62 | 0.5 | 3:55 |
| Example 3 | 82.1 | 37.2 | 211.9 | 335.1 | 1.80 | 1.88 | 0.5 | 3:58 |
| Example 4 | 82.2 | 37.0 | 217.8 | 334.6 | 1.50 | 1.54 | 0.5 | 4:05 |
| Example 5 | 81.2 | 36.8 | 224.7 | 337.9 | 3.34 | 2.02 | 0.5 | 4:10 |
| Example 6 | 81.8 | 37.0 | 218.7 | 334.0 | 2.38 | 1.95 | 0.5 | 4:05 |
| Example 7 | 82.5 | 37.8 | 211.5 | 321.2 | 1.32 | 1.54 | 0 | 3:57 |
| Example 8 | 83.0 | 38.0 | 211.6 | 320.7 | 1.02 | 1.13 | 0 | 3:55 |
| Comp. Ex. 1 | 83.9 | 38.4 | 195.1 | 323.4 | 1.53 | 1.57 | 0.5 | 5:30 |
| Comp. Ex. 2 | 85.9 | 40.1 | 203.7 | 323.4 | 2.47 | 0.73 | 0.5 | 6:46 |
| Comp. Ex. 3 | 87.7 | 41.6 | 206.0 | 335.8 | 6.26 | 0.82 | 3.0 | 7:30 |
| Comp. Ex. 4 | 84.2 | 38.8 | 207.7 | 330.4 | 5.36 | 3.03 | 1.5 | 5:20 |
| Comp. Ex. 5 | 80.8 | 36.8 | 202.5 | 318.6 | 0.23 | 6.01 | 0.5 | Imposs. to process |
| Comp. Ex. 6 | 80.6 | 34.1 | 201.8 | 336.4 | 4.54 | 2.50 | 0.5 | 4:18 |
| Comp. Ex. 7 | 86.4 | 39.5 | 220.3 | 302.1 | 4.52 | 0.89 | 2.0 | 4:45 |

Referring to the results of Table 2, it could be confirmed that the plasticizer compositions of the present invention showed good plasticization efficiency with excellent tensile strength and equivalent level of elongation rate, and noticeably improved absorption rate when compared to Comparative Examples 1 to 2, which are the conventional phthalate-based products, and big improvements were observed on tensile strength, absorption rate, plasticization efficiency, migration loss and volatile loss, further, stress resistance even compared to Comparative Examples 3 and 4, which are eco-friendly products. In addition, through the excellent physical properties simultaneously, without deterioration of any one, it could be confirmed that the plasticizer compositions of the present invention are suitable for mass production, and are stable products.

Also, it could be confirmed that the plasticizer compositions of the present invention accomplished the equal or better levels when compared to the plasticizers of Comparative Examples 1 and 2, which are the conventional phthalate-based plasticizers with high performance but inducing fatal environmental issues, and are very suitable as substitutes.

In addition, Comparative Example 5 in which an esterification product of glycerol and an acid was used, but a mixture of n-butanoic acid and benzoic acid other than the mixture of the hexanoic acid isomer mixture and benzoic acid was used as an acid, showed markedly low elongation rate in contrast to the Examples of the present invention, and showed markedly inferior results in view of volatile loss in contrast to the Examples of the present invention. Further, in the case of Comparative Example 5, in the experiment for measuring absorption rate, impossible results to process were shown.

In addition, Comparative Example 6 in which only the hexanoic acid isomer mixture was applied without the benzoic acid, showed markedly inferior tensile strength, migration loss and volatile loss in contrast to the Examples. From the results, it could be confirmed that the plasticizer composition of the present invention could accomplish the improving effects by applying the benzoic acid and hexanoic acid simultaneously in contrast to a case of applying only one among them.

Meanwhile, Comparative Example 7 in which 2-ethylhexanoic acid that is an acid with 8 carbon number was used instead of hexanoic acid, showed inferior plasticization efficiency, elongation rate, migration loss and stress resistance in contrast to the Examples. From the results, it could be confirmed that, in order to achieve excellent plasticization efficiency, mechanical properties, various properties such as stress resistance and processability in balance, hexanoic acid with 6 carbon atoms is required to be applied as the isomer mixture type, and benzoic acid is required to be applied together as in the Examples of the present invention.

Experimental Example 2: Evaluation of Plastisol Performance

By using the plasticizers of the Examples and Comparative Examples, specimens were manufactured according to ASTM D638 and the formulation and manufacturing conditions below.

(1) Formulation: 100 parts by weight of a paste vinyl chloride polymer (KH-10), 70 parts by weight of a plasticizer, 3 parts by weight of a stabilizer (BZ-119), 3 parts by weight of a foaming agent (AC5000) and 40 parts by weight of a filler (OMYA-10)

(2) Mixing: mixing at 1000 rpm for 15 minutes (3) Test items

1) Viscosity: Measurement was performed as Brookfield viscosity, using a Brookfield (LV type) viscometer, #64 was used as a spindle, measurement rate was 6 rpm and 60 rpm, and measurement temperatures were 25° C. and 40° C.

(4) Evaluation results

The evaluation results on the test items are shown in Table 3 below.

TABLE 3

| | 25° C./6 rpm | | | 25° C./60 rpm | | | 40° C./6 rpm | | | 40° C./60 rpm | | |
|---|---|---|---|---|---|---|---|---|---|---|---|---|
| | 1 hr | 24 hr | Δ | 1 hr | 24 hr | Δ | 1 hr | 24 hr | Δ | 1 hr | 24 hr | Δ |
| Example 1 | 1400 | 1600 | 200 | 1160 | 1390 | 230 | 1100 | 2000 | 900 | 850 | 1590 | 740 |
| Example 2 | 1400 | 1600 | 200 | 1200 | 1400 | 200 | 1050 | 2000 | 950 | 900 | 1550 | 650 |
| Example 3 | 1350 | 1500 | 150 | 1180 | 1430 | 250 | 1100 | 1900 | 800 | 870 | 1550 | 680 |
| Example 4 | 1370 | 1570 | 200 | 1200 | 1400 | 200 | 1050 | 2000 | 950 | 880 | 1550 | 670 |
| Example 5 | 700 | 1100 | 400 | 600 | 860 | 250 | 400 | 1500 | 1100 | 450 | 1450 | 1000 |
| Example 6 | 850 | 1200 | 350 | 750 | 1200 | 450 | 500 | 1750 | 1250 | 650 | 1500 | 850 |
| Example 7 | 1500 | 1700 | 200 | 1200 | 1500 | 300 | 1100 | 1900 | 800 | 1000 | 1600 | 600 |
| Example 8 | 1600 | 1800 | 200 | 1300 | 1750 | 450 | 1300 | 2400 | 1100 | 1100 | 1800 | 700 |
| Comp. Ex 1 | 1700 | 2700 | 1000 | 1930 | 2340 | 410 | 1500 | 2500 | 1000 | 1180 | 2060 | 880 |
| Comp. Ex. 2 | 2300 | 2400 | 100 | 2080 | 2570 | 490 | 1700 | 2700 | 1000 | 1270 | 1710 | 440 |
| Comp. Ex. 3 | 2200 | 2300 | 100 | 2020 | 2300 | 280 | 1300 | 1900 | 600 | 1220 | 1450 | 230 |
| Comp. Ex. 4 | 1200 | 1900 | 700 | 1380 | 1650 | 270 | 1200 | 1900 | 700 | 870 | 1390 | 520 |
| Comp. Ex. 5 | 1900 | 2400 | 500 | 1920 | 2440 | 520 | 1600 | 10600 | 9000 | 1520 | 7390 | 5870 |
| Comp. Ex. 6 | 500 | 800 | 300 | 470 | 570 | 100 | 300 | 1200 | 900 | 370 | 740 | 370 |
| Comp. Ex. 7 | 2300 | 3200 | 900 | 2300 | 2900 | 600 | 1800 | 3000 | 1200 | 1400 | 2100 | 700 |

Referring to the results of Table 3, it could be found that the plasticizer compositions of Examples 1 to 4 showed very low initial viscosity themselves during plastisol processing, and processing was significantly favorable, and showed a small viscosity change according to time, and viscosity stability was excellent. However, it could be found that Comparative Examples 1 to 4, which correspond to the conventional products, showed high viscosity themselves, and plastisol processing was very disadvantageous in contrast to the Examples. Particularly, in the cases of Comparative Examples 1 to 4, the viscosity change was large as well as an initial viscosity, and it could be confirmed that performance was markedly inferior in the plastisol processing in contrast to the plasticizer composition of the present invention.

Meanwhile, it could be confirmed that Comparative Examples 5 and 7, in which the esterification reaction of glycerol was used for preparing plasticizer compositions similar to the plasticizer composition of the present invention, but different acids were used, showed inferior performance in a plastisol processing in contrast to the Examples of the present invention. Particularly, in the case of Comparative Example 5 in which n-butanoic acid and benzoic acid were mixed and used, an initial viscosity was higher in contrast to the Examples of the present invention, and processing itself was impossible, and the viscosity change according to time was also high, and viscosity stability was also deteriorated. In addition, in the case of Comparative Example 7 in which an acid with 8 carbons was used instead of hexanoic acid with 6 carbons, an initial viscosity was also high, the viscosity change according to time was also high, and viscosity stability was also deteriorated.

Meanwhile, in the case of Comparative Example 6 in which only a hexanoic acid isomer mixture was used among the hexanoic acid isomer mixture and the benzoic acid, used in the Examples of the present invention, good effects were shown in view of initial viscosity and viscosity stability, but as confirmed from the sheet prescription results as examined above, migration loss and volatile loss during sheet prescription were significantly inferior.

From the results, it could be confirmed that the plasticizer composition of the present invention uses a 6 carbon hexanoic acid isomer mixture and benzoic acid together, and excellent physical properties may be maintained during the conventional sheet prescription and excellent processability and viscosity stability could be accomplished in a plastisol processing.

The invention claimed is:

1. A triester-based plasticizer composition, comprising: one or more triesters of Formula 1, wherein $R_1$ to $R_3$ of Formula 1 are derived from a carboxylic acid composition comprising a hexanoic acid isomer mixture and benzoic acid, and wherein the hexanoic acid isomer mixture comprises cyclopentyl methanoic acid:

[Formula 1]

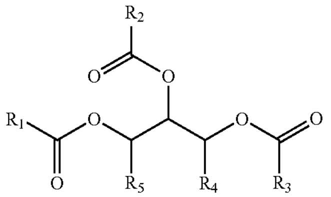

wherein in Formula 1, $R_1$ to $R_3$ are each independently an n-pentyl group, a branch-type pentyl group, a cyclopentyl group, or a phenyl group, and $R_4$ and $R_5$ are each independently hydrogen or an alkyl group of 1 to 4 carbon atoms.

2. The plasticizer composition according to claim 1, wherein the carboxylic acid composition comprises the hexanoic acid isomer mixture and the benzoic acid in a weight ratio of 99:1 to 50:50.

3. The plasticizer composition according to claim 1, wherein the hexanoic acid isomer mixture has a degree of branching of 2.0 or less.

4. The plasticizer composition according to claim 1, wherein the hexanoic acid isomer mixture comprises 2-methylpentanoic acid and 3-methylpentanoic acid.

5. The plasticizer composition according to claim 1, wherein the hexanoic acid isomer mixture comprises 1-hexanoic acid, 2-methylpentanoic acid and 3-methylpentanoic acid.

6. The plasticizer composition according to claim 1, wherein the hexanoic acid isomer mixture comprises 20 to 95 parts by weight of a branch-type hexanoic acid, with respect to total 100 parts by weight of the mixture.

7. The plasticizer composition according to claim 1, wherein the hexanoic acid isomer mixture comprises 30 parts by weight or less of cyclopentyl methanoic acid, with respect to total 100 parts by weight of the mixture.

8. The plasticizer composition according to claim 1, wherein $R_4$ and $R_5$ are hydrogen.

9. A resin composition comprising:

100 parts by weight of a resin; and 5 to 150 parts by weight of the plasticizer composition according to claim 1.

10. The resin composition according to claim 9, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, and synthetic rubber.

* * * * *